April 23, 1968  R. W. MOWELL ETAL  3,379,027
ROLLER-SUPPORTED LNG PIPELINE
Filed March 30, 1965  3 Sheets-Sheet 1

ROGER W. MOWELL
JOHN MASCENIK   Inventors

By Donald F. Wohlers
Patent Attorney

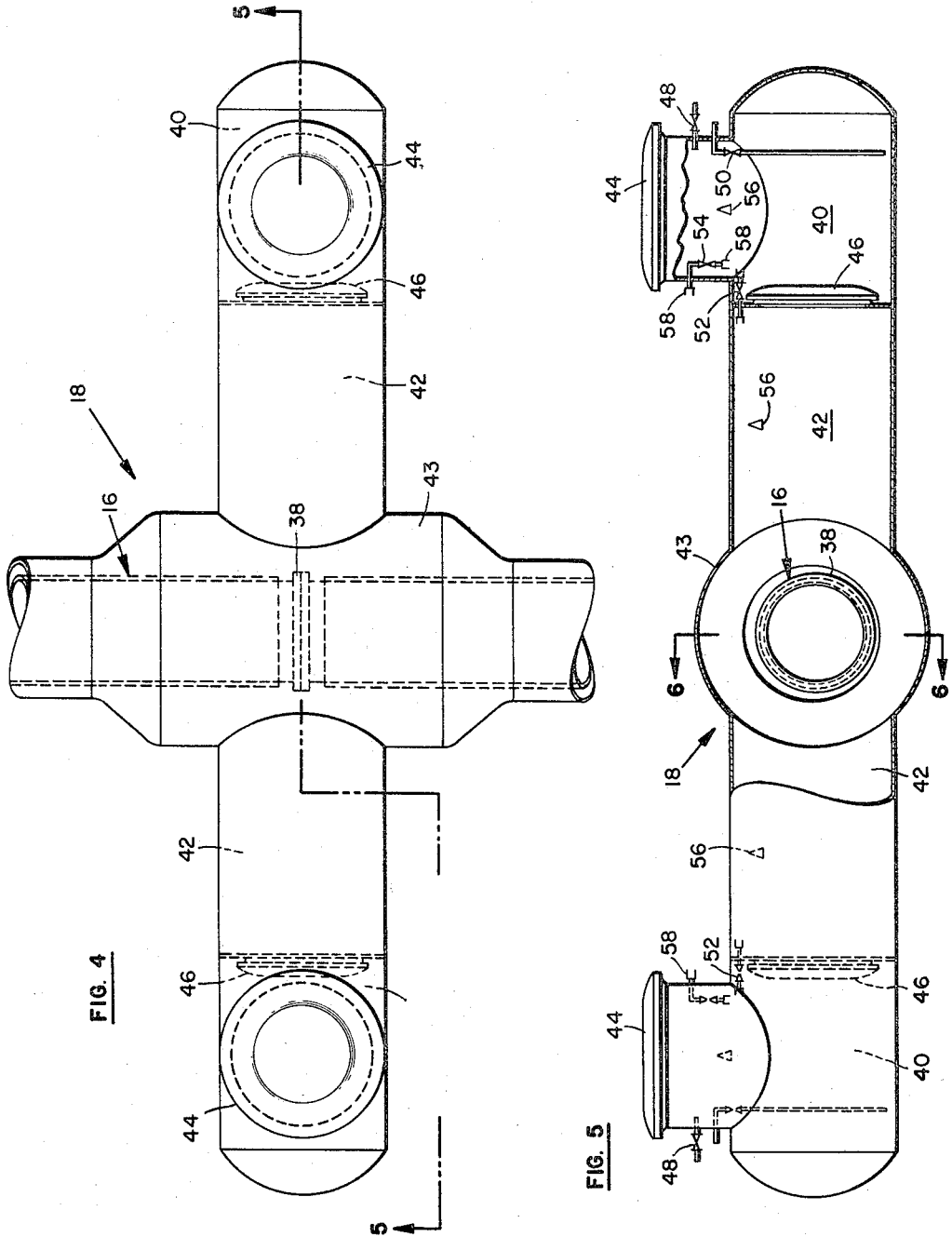

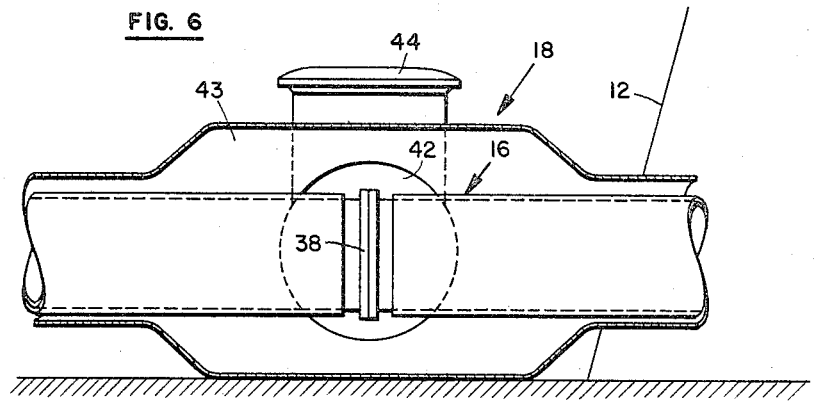
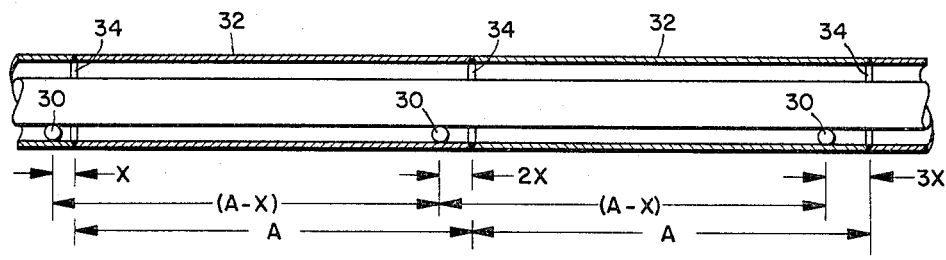
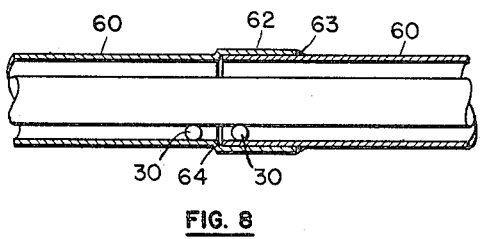
ROGER W. MOWELL
JOHN MASCENIK   Inventors

United States Patent Office 3,379,027
Patented Apr. 23, 1968

3,379,027
ROLLER-SUPPORTED LNG PIPELINE
Roger W. Mowell, West Caldwell, and John Mascenik, Mount Tabor, N.J., assignors to Esso Research and Engineering Company, a corporation of Delaware
Filed Mar. 30, 1965, Ser. No. 444,003
3 Claims. (Cl. 62—55)

ABSTRACT OF THE DISCLOSURE

An insulated submerged LNG pipeline extending between a shore based facility and an offshore ship loading terminal. The LNG-carrying inner pipe is thermally insulated and roller supported to permit thermal expansion and contraction relative to a surrounding casing pipe and to permit withdrawal of the entire pipe length from the casing onto the shore for inspection and maintenance of the insulation system.

---

This invention relates in general to insulated pipelines, and in particular to improvements in submarine insulated pipelines operating at cryogenic temperatures wherein large thermal contractions and expansions may take place. The invention also relates to improvements in an insulated submarine pipeline facilitating periodic inspection and maintenance of the insulation system.

The invention contemplates the provision of an insulated submerged pipeline extending from a shore-based storage facility to an offshore ship loading mooring. The pipeline would be submerged on the sea bottom and would operate to convey either a heated or cooled fluid from the shore-based storage facility to the ship loading mooring. While the invention will be described henceforth in connection with the transportation of liquefied natural gas at cryogenic temperatures in the range of —235° F. to —260° F., it should be appreciated that the invention is not limited to transportation of liquids at that temperature but is equally adaptable to the transportation of fluids at elevated temperatures wherein a corresponding dimensional change occurs.

The invention includes an insulated center pipe through which the liquefied natural gas (LNG) at approximately —260° F. is pumped. The insulated pipe is supported on rollers within a concrete jacketed outer casing. The casing is fixedly anchored at both the land end and the submerged end. The inner insulated pipe is anchored only at the submerged end, leaving its shore-based end free to permit axial movement in accordance with thermal expansion and contraction thereof. The rollers encircling the inner insulated line freely suport it and upon contraction thereof upon cooling down to service temperature permit the shortening of the inner line with negligible stress due to roller friction. The outer casing as previously mentioned is anchored at both ends to prevent any movement thereof either in response to inner line rolling or temperature variation. On completion of the initial cooling down of the inner line by the introduction of the LNG, an expansion loop is installed in the inner line at the shore end to absorb relatively small thermal movements after the initial contraction of the line has occurred. Allowance for initial contraction is made by means of flexible hose or a special expansion loop incorporating ball joints or bellows joints to accommodate the relatively large movements.

A feature of the invention is a provision of novel submerged chamber means providing access to one or more flanged joints in the pipeline so that a diver may perform the necessary uncoupling of selected portions of the pipeline to permit the withdrawal of the pipeline in one or several sections axially from the interior of the anchored casing onto the shore for periodic inspection and maintenance of the insulation system. The submerged work chambers include opposite portions providing access to either side of the pipe flange joints and each side includes a pair of pressurized chambers communicating with one another through access hatches. It is also envisioned that access to the submerged end of the pipeline could be by means of a caisson extending from the sea bed to a substantial distance above the water.

Another feature of the invention is the provision of novel means, wholly exterior of the insulation system movably supporting the pipe and insulation. This feature of the invention envisions means secured to a band encircling the insulation wholly exterior thereof which does not in any way jeopardize the efficiency of the insulation at the support point. Still another feature of the invention is the provision of an outer casing pipe diameter slightly in excess of the contact circle diameter described by the pipe supporting rollers. In the embodiments of the invention shown, three rollers are employed spaced at 120° sectors. While as shown the pipe load is supported by the lower two rollers, should the pipe assume an irregular contour on the sea bottom, the clearance between the upper roller and the inner diameter of the casing pipe operates to permit the free and unrestrained withdrawal of the pipe onto the shore even though slight variations in the contour of the casing may occur.

A further feature of the invention is the novel placement and spacing of the longitudinal position of the rollers relative to the welded joints of the outer casing pipe. The spacing is selected to be slightly less than the predetermined spacing of the girth welds of the casing so that upon lengthwise withdrawal of the roller supported inner pipe a sequential and noncoincident weld contact will occur between the rollers and the joints, thereby considerably reducing the resistance to removal.

Accordingly, it is an object of the invention to provide an improved insulated submarine pipeline which is free of large stress loads due to thermal expansion and contraction.

A further object of the invention is to provide an improved insulated submarine pipeline which is easily maintained by the lengthwise removal of the inner pipe from the outer casing pipe.

Another object of the invention is to provide improved means for working on and maintaining portions of the pipeline while it remains in a submerged condition.

Another object of the invention is to provide a novel roller support means which does not alter the thermal efficiency of the insulation system.

Another object of the invention is to provide a novel offshore ship loading device for liquids at cryogenic temperatures.

Other objects and advantages of the invention will become apparent and the invention will be fully understood from the following description and drawings in which:

FIG. 4 is a top plan view of the pipeline maintenance and submarine access chamber of the invention;

FIG. 5 is an elevation view of the structure of FIG. 4 showing portions in section taken along lines 5—5 of FIG. 4;

FIG. 6 is a side elevational view of the maintenance and access chamber with portions broken away;

FIG. 7 is a schematic view showing the optimized spacing of the roller support means of the invention relative to the girth weld spacing of the casing; and FIG. 8 is a schematic view similar to FIG. 7 showing an alternate embodiment of roller support placement preferred with an alternate embodiment of casing pipe joint.

Figures 1, 2, 3:
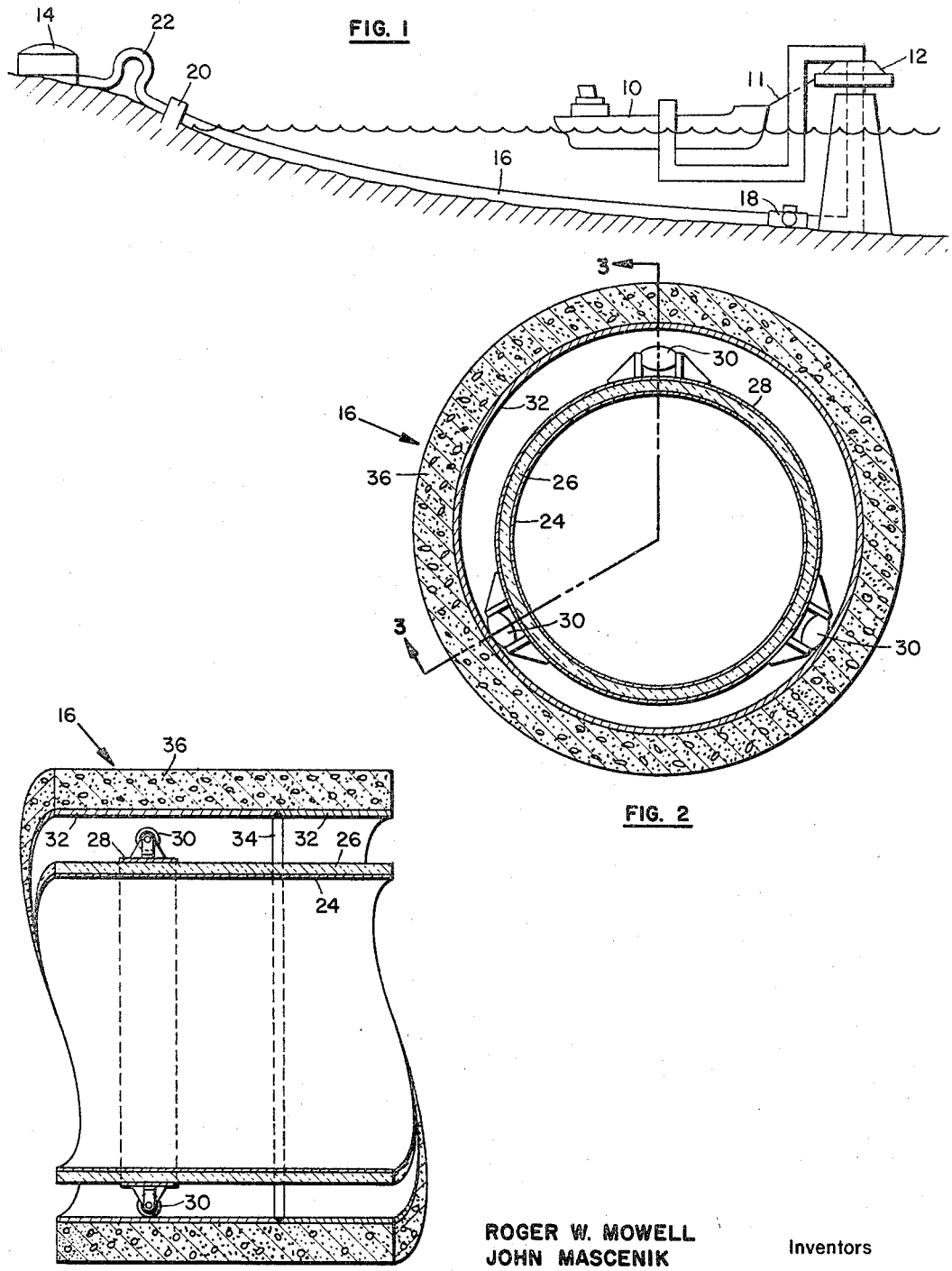
FIG. 1 is a schematic plan view of the invention as it would be employed in connection with an offshore ship mooring and loading station.
FIG. 2 is a cross-sectional view of an insulated pipeline of the invention.
FIG. 3 is a fragmentary cross-sectional view of the pipeline taken generally along lines 3—3 of FIG. 2.

It will be understood that the drawings illustrate merely a preferred embodiment of the invention and that other embodiments are contemplated within the scope of the claims hereafter set forth.

Referring to the drawings in particular, a tanker vessel 10 is moored by a line 11 to an offshore mooring and loading tower indicated generally at 12. A shore based storage tank 14 communicates with the loading and mooring tower 12 through a submerged insulated pipeline shown generally at 16. The outboard or submerged end of the pipeline 16 includes an anchoring and maintenance chamber 18, while the inboard end employs an anchoring means 20 which is effective to secure and anchor the outer casing of the submerged pipeline. An expansion loop generally indicated at 22 is provided between the anchoring means 20 and storage tank 14. The expansion loop 22 is schematically shown herein and those skilled in the art will readily appreciate that numerous forms of constructions may be employed for such purpose. As contemplated, the present invention will employ a temporary, highly flexible expansion loop for initial passage of the LNG during the cool-down of the inner line to take up the initial contraction. On completion of the cool-down, a second and permanent expansion loop will be fitted into the inner line at the shore end to absorb the relatively small thermal movements associated with minor changes in the operating temperature of the pipeline.

In FIGS. 2 and 3 the detailed construction of the insulated pipeline is shown. The pipeline includes an inner pipe 24 forming a fluid conduit for the low temperature LNG. The pipe 24 is preferably made of a material such as 9% nickel steel having high strength qualities at the service temperature of the LNG. Surrounding the pipe is a layer of suitable thermal insulation material 26 which may be of any required thickness to provide the necessary thermal efficiency for maintaining the heat loss of the LNG material during its passage through the pipeline to a negligible amount. Surrounding the insulation material 26 are a plurality of roller means spaced at predetermined intervals along the length of the pipeline. Each of the roller means includes a circumferential band 28 secured to the insulation periphery in any suitable manner. Each band 28 includes a plurality of rotatably barrel-shaped rollers 30 spaced about the band periphery at approximately 120° positions. Each of the rollers 30 is pivotally supported between suitable brackets affixed to the band 28 so that the pivotal axis of each is substantially transverse and at right angles to the lengthwise axis of the inner pipe 24. The curvature of the rollers 30 is preferably selected to be sharper or greater than the radius of curvature of the inside diameter of a surrounding casing pipe 32 to produce point contact therebetween rather than line contact which would result if they were of equal curvature. This outer casing pipe 32 includes an exterior layer of concrete 36 of sufficient thickness to make the entire pipeline assembly rest firmly on the sea bottom where it will be immune from normal wave and wind action of the sea. The outer casing pipe 32 is formed of a plurality of substantially equal length pipe sections connected in end to end welded relationship by a weld 34. It should be noted in FIGS. 2 and 3 that the radial spacing of the contact surfaces of the rollers 30 is selected to be slightly less than the diameter of the inside of the pipe 32. In this way a clearance gap is provided between the uppermost designated roller 30 and the pipe 32. This clearance insures that should minor deviations in the path of the outer casing occur due to conformity thereof with the sea bottom, or that the pipes be slightly out of round, that the inner pipe is nevertheless free to expand and contract in an axial direction without undue frictional resistance or need for the inner pipe to necessarily conform to the sea contour along with the outer pipe 32. The reduced diameter of the rollers 30 also assists in minimizing friction when the inner pipe is withdrawn for maintenance as later explained.

Referring to FIGS. 4, 5 and 6, the details of the anchoring and maintenance chamber 18 are shown. The chamber 18 surrounds a conventional bolted flange connection between adjacent inner pipe ends which has been designated generally at 38. The chamber 18 includes a pair of pressure chambers designated 40, 40 which connect through interior hatches 46, 46 respectively to a pair of work chambers 42, 42. The inner ends of the work chambers 42 communicate with an enlarged outer pipe section designated 43 so that limited but adequate working space is provided about the flange 38 so that the bolts therein (not shown) may be made accessible to permit severence of the inner pipe at this station to permit withdrawal thereof to the shore for maintenance purposes. Each of the pressure chambers 40 is also provided with an entry hatch 44 in communication with the surrounding sea water. In the use of these pressure chambers, an underwater diver or frogman or diving bell transported maintenance personnel enter the chamber 40 which during entry would become flooded with sea water due to the removal of the hatch 44. Upon refastening of the hatch 44 and the application of suitable pneumatic pressure through couplings 58 and valve 54, all of the interior sea water could be expelled through the conduit and an inner flood valve 50 by the application of the air pressure to the interior of the chamber 40. Thereafter, once the maintenance personnel have purged the sea water from the chamber 40, the intermediate hatch 46 is removed to permit passage into the air filled work chamber 42 so that the required task may be performed with relative ease in a substantially normal working atmosphere. Other suitable fluid fittings such as a pressure equalizer valve 52 is provided to place chambers 40 and 42 in communication as required. The chambers are also provided with suitable communications jacks designated 56 and an outer flood valve 48 which may be opened from the exterior of the chamber to allow entry of sea water thereto as required. While only a single chamber 18 has been shown at the outboard end of the pipeline, it should be understood that several may be provided to facilitate the withdrawal of the pipeline in two or more sections.

Referring now to FIG. 7, a schematic view of one form of predetermined spacing between the rollers 30 associated with each of the inner pipe lengths relative to the predetermined spacing of the welds 34 securing adjacent ends of the outer casing pipe lengths is shown. In FIG. 7 where the length of each casing pipe length 32 is designated by dimension A, the spacing between the rollers 30 is selected to be A–X. In this way during removal of the pipe only one set of rollers 30 will be in contact with any weld at any one instant.

Referring to FIG. 8, an alternate form of casing pipe end connection arrangement is shown. In this embodiment a casing pipe 60 includes an enlarged end portion 62 which forms an overlapping connection with the adjacent end of a similar pipe 60. Because the welded connection 63 of the casing pipe is made only on the outside edge, a notch 64 will necessarily exist on the interior of the joint. In order to prevent an unduly large increase in friction due to roller passage over the notch 64 during removal of the pipe in this arrangement, a pair of roller bands would be placed closely adjacent one another as indicated by the positioning of the rollers 30, 30 so that when one set of rollers overlies the notch, the adjacent set of rollers will support the entire load of the pipe and therefore no unduly large friction will be induced by the passage of the rollers over the notch 64.

While a specific embodiment of the invention has been shown and described in detail to illustrate the application of the inventive principles, it will be understood that the invention may be embodied otherwise without departing from such principles.

What is claimed is:

1. An offshore ship loading and unloading device for liquids at cryogenic temperatures comprising, a mooring pylon secured at its base to the sea bottom, means for mooring a ship to said pylon and for allowing said ship to weathervane thereabout, and a submerged piepline extending from a shore-based storage facility to the bottom of said pylon; said pipeline including a plurality of inner conduit means joined end to end and each formed of a metallic material having high strength properties at cryogenic temperature, thermal insulation means of substantially uniform outside diameter secured about the exterior of said conduit means, outer casing means surrounding said conduit and insulation means and spaced therefrom, and a plurality of roller means attached exteriorly of said insulation means for supporting said conduit means and permitting lengthwise movement thereof relative to said casing means; each said roller means comprising a circular band extending about and in surface contact with the outside surface of said insulation means, a plurality of barrel-shaped rollers having a curvature greater than the curvature of the inside diameter of said casing means, means for pivotally mounting each of said rollers means to said band with the rotational axis of each roller means transverse to the longitudinal axis of said conduit means, a concrete jacket surrounding said casing means for maintaining said pipeline in a submerged condition upon the sea bed, means at one end of said casing means for securing said casing means to the shore, and means at the opposite end for securing said casing means to said mooring pylon, said last mentioned means including an enlarged casing portion about the outboard end of said conduit means forming a working space about said inner conduit means at its outboard end for permitting underwater access thereto to disconnect said conduit means adjacent the mooring pylon whereby the insulated conduit means may be withdrawn from the interior of said casing means to a position on the shore to permit maintenance and repair thereof.

2. The combination of claim 1 wherein said enlarged casing portion includes an inner work chamber surrounding said conduit means, and a pressure chamber communicating with said work chamber for permitting entry thereto from the surrounding water exterior of said casing portion.

3. Apparatus in accordance with claim 2 wherein the outer rolling contact points of said barrel-shaped rollers lie in a circle of substantially smaller diameter than the inside diameter of said casing means.

References Cited

UNITED STATES PATENTS

| | | | |
|---|---|---|---|
| Re. 25,890 | 10/1965 | McCammon | 137—236 X |
| 2,749,944 | 6/1956 | Williamson | 138—113 |
| 2,531,658 | 11/1950 | Walsh | 138—114 X |
| 2,706,496 | 4/1955 | Bond | 138—113 |
| 3,169,576 | 2/1965 | Lee | 138—113 X |
| 3,267,969 | 8/1966 | Mallard | 138—178 |
| 2,335,450 | 11/1943 | Sandberg | 61—83 |

WILLIAM F. O'DEA, *Primary Examiner.*

H. W. WEAKLEY, *Assistant Examiner.*